US007643683B2

(12) United States Patent
Miller (10) Patent No.: US 7,643,683 B2
(45) Date of Patent: Jan. 5, 2010

(54) GENERATION OF IMAGE DATABASE FOR MULTIFEATURED OBJECTS

(75) Inventor: Michael Miller, Jackson, NH (US)

(73) Assignee: Animetrics Inc., Conway, NH (US)

( * ) Notice: Subject to any disclaimer, the term of this patent is extended or adjusted under 35 U.S.C. 154(b) by 528 days.

(21) Appl. No.: 10/794,352

(22) Filed: Mar. 5, 2004

(65) Prior Publication Data

US 2004/0175041 A1    Sep. 9, 2004

Related U.S. Application Data

(60) Provisional application No. 60/452,429, filed on Mar. 6, 2003, provisional application No. 60/452,430, filed on Mar. 6, 2003, provisional application No. 60/452,431, filed on Mar. 6, 2003.

(51) Int. Cl.
    *G06K 9/66* (2006.01)
(52) U.S. Cl. ............... 382/190; 382/209; 382/118; 345/419; 345/423
(58) Field of Classification Search ......... 382/190–294; 345/419–423
    See application file for complete search history.

(56) References Cited

U.S. PATENT DOCUMENTS

| | | | |
|---|---|---|---|
| 5,742,291 A | 4/1998 | Palm | |
| 5,844,573 A | 12/1998 | Poggio et al. | |
| 5,990,901 A | 11/1999 | Lawton et al. | |
| 6,226,418 B1 | 5/2001 | Miller et al. | |
| 6,249,600 B1 | 6/2001 | Reed et al. | |
| 6,320,578 B1 * | 11/2001 | Shiitani et al. | 345/419 |
| 6,362,833 B2 | 3/2002 | Trika | |
| 6,366,282 B1 * | 4/2002 | Trika | 345/423 |
| 6,381,346 B1 | 4/2002 | Eraslan | |
| 6,434,278 B1 | 8/2002 | Hashimoto | |
| 6,529,626 B1 | 3/2003 | Watanabe et al. | |
| 6,532,011 B1 | 3/2003 | Francini et al. | |
| 6,556,196 B1 | 4/2003 | Blanz et al. | |
| 2001/0038713 A1 * | 11/2001 | Kitagawa et al. | 382/209 |
| 2002/0012454 A1 | 1/2002 | Liu et al. | |
| 2002/0106114 A1 | 8/2002 | Yan et al. | |
| 2003/0099409 A1 | 5/2003 | Rowe | |
| 2003/0123713 A1 * | 7/2003 | Geng | 382/118 |
| 2003/0169906 A1 | 9/2003 | Gokturk et al. | |

FOREIGN PATENT DOCUMENTS

EP        1 039 417        9/2000

(Continued)

OTHER PUBLICATIONS

Weisstein, "Matrix Norm," Dec. 22, 2003, http://mathworld.wolfram.com/MatrixNorm.html (2 pages).

(Continued)

*Primary Examiner*—Samir A. Ahmed
*Assistant Examiner*—Tsung-Yin Tsai
(74) *Attorney, Agent, or Firm*—Wilmer Cutler Pickering Hale and Dorr LLP (57) ABSTRACT

A method and system for generating an image database for multifeatured objects. The invention uses one or more three-dimensional representations of multifeatured objects of the same generic type as the object to be identified to generate as many images as desired. These images are used to populate an image database that may be used for training and/or identification purposes.

20 Claims, 5 Drawing Sheets

FOREIGN PATENT DOCUMENTS

| | | |
|---|---|---|
| EP | 1 143 375 | 10/2001 |
| EP | 1 204 069 | 5/2002 |
| WO | 01/63560 | 8/2001 |

OTHER PUBLICATIONS

Weisstein, "Projective Geometry," Dec. 22, 2003, http://mathworld.wolfram.com/ProjectiveGeometry.html (3 pages).

Eriksson et al., "Towards 3-dimensional face recognition," *IEEE Cape Town*, (Sep. 28, 1999), pp. 401-406.

Hsu et al., "Face modeling for recognition," *Proceedings 2001 International Conference on Image Processing*, vol. 1 (Oct. 7, 2001), pp. 693-696.

International Search Report for PCT/US2004/006604, Sep. 2, 2004; 18 pages.

International Search Report for PCT/US2004/006614, Aug. 26, 2004; 15 pages.

International Search Report for PCT/US2004/006827, Aug. 26, 2004; 15 pages.

Lanitis et al., "Toward Automatic Simulation of Aging Effects on Face Images," *IEEE Transactions on Pattern Analysis and Machine Intelligence*, vol. 24, No. 4 (Apr. 2002), pp. 442-455.

Lee et al., "3-D deformable face model for pose determination and face synthesis," *IEEE Computer Society*, (Sep. 27, 1999) pp. 260-265.

Lopez et al., "3D head pose computation from 2D images: templates versus features," *IEEE Computer Society*, vol. 3 (Oct. 23, 1995), pp. 599-602.

Pighin et al., "Synthesizing realistic facial expressions from photographs," *Computer Graphics Conference Proceedings*, (Jul. 19, 1998), pp. 75-84.

Tang et al., "Face recognition using synthesized intermediate views," *Proceedings of the 38th Midwest Symposium in Rio de Janeiro, Brazil*, (Aug. 13, 1995), pp. 1066-1069.

Rein-Lien Hsu et al., "Face modeling for recognition" Proceedings 2001 International Conference on Image Processing. ICIP 2001. Thessaloniki, Greece, Oct. 7-10, 2001, International Conference on Image Processing, New York, NY: IEEE, US, vol. vol. 1 of 3. Conf. 8, Oct. 7, 2001, pp. 693-696, XP010563858 ISBN: 0-7803-6725-1.

Li-An Tang et al., "Face recognition using synthesized intermediate views" Circuits and Systems, 1995., Proceedings., Proceedings of the 38th Midwest Symposium on Rio De Janeiro, Brazil Aug. 13-16, 1995, New York, NY USA, IEEE, US, Aug. 13, 1995, pp. 1066-1069, XP010165313 ISBN: 0-7803-2972-4.

European Patent Office, Communication Pursuant to Article 96(2) EPC, Sep. 21, 2007.

* cited by examiner

GENERATION OF IMAGE DATABASE FOR MULTIFEATURED OBJECTS

RELATED APPLICATIONS

This application claims priority to and the benefits of U.S. Provisional Applications Serial Nos. 60/452,429, 60/452,430 and 60/452,431 filed on Mar. 6, 2003 (the entire disclosures of which are hereby incorporated by reference).

FIELD OF THE INVENTION

The present invention relates to the generation of image databases, and more particularly to the generation of 2D images to populate image databases using 3D representations of multifeatured objects.

BACKGROUND OF THE INVENTION

Image databases have a variety of uses. In one important use, systems that identify objects of a particular generic type may acquire recognition capability through "training" based on a database of photographs of such objects; by "training" is meant creation and refinement of a system, such as a series of probes, that facilitate search and matching. Alternatively, the database may be used directly as a reference set for comparison without training. In either case, the photographs are analyzed to yield empirically-determined properties which serve as probes for the objects to be identified. For any particular identification to be performed, the efficacy depends, in part, on how well the image database actually spans the type of object and the conditions under which the photographs were taken. For example, when trying to identify a target human face, the reliability of the identification depends on whether the database includes photographs of individuals who resemble the target taken with pose and lighting conditions that correspond to that of the target face.

A key limitation of conventional identification training systems is that they rely on existing photographs. In situations where the existing photographs include individuals taken with poses and lighting which correspond, even approximately, to those of the target, the training database may yield effective probes. However, when the database photographs do not include such images, the database will be less useful, since it will not contain images that resemble the target. Conventional training systems are usually unable to remedy this problem without appropriate photographic data corresponding to the target. Often, photographs taken from a standard pose are available, but the target view is from a non-standard pose. Using the example of a human face again, if the database contains mainly front-view photographs, a captured front view of the target will be identifiable, but a side view may not be. If a database of side view photographs is not available, the system may fail to identify the target.

Since conventional training systems rely on existing sources of imagery, they may be forced to combine images of many individual examples of the class of object to be identified in order to obtain a large enough database from which to draw statistically reliable probes. This has the effect of making the probes more generic, since they now detect features common to a set of objects rather than to an individual object. This can present a problem when identification of a particular individual object is desired.

Accordingly, there exists a need for a practical approach that creates an image database that can be used effectively for identification purposes when available photographic data is inadequate.

SUMMARY OF THE INVENTION

The present invention provides a method and system for creating a database of images of multifeatured objects. The image database may be used for the purpose of training an identification system or for use directly in identification. The technique uses one or more 3D representations of the multifeatured object(s). In the case where a single individual object is to be identified, a single 3D representation corresponding to the object is used to generate the database. If more than one individual object is to be identified, the database is generated by combining images from 3D representations of each individual, if they are available. An image database may also be created when a 3D representation of the particular object to be identified is not available. One or more 3D representations of generically similar objects may be used instead. An image database for training or identifying any member of a generic type may be created by combining images generated from a large set of 3D representations of objects of the generic type.

The images may be generated from the 3D representation by producing 2D projections from a range of viewpoints and under a range of lighting conditions. In addition, small or large deformations of each 3D representation corresponding to anticipated internal movements of the target object can be used to generate projections. The database may be indexed and classified using known methods. For example, indexing may be performed according to pose (e.g., position in three dimensions, rotations in three dimensions, and deformation). The classification of images may be hierarchical, and probes may be generated using Bayesian classifiers, neural nets, or other techniques.

In a first aspect, therefore, the invention comprises a method of creating a database of images of multifeatured objects of a generic type. In accordance with the method, at least one reference 3D representation of a multifeatured object of the generic type is provided. The reference 3D representation(s) may include a representation that corresponds to at least one of the target multifeatured objects. The reference 3D representation(s) are used to generate a plurality of images. The image database is then populated with the generated images. In one embodiment, the images are generated from a range of small or large deformations of each 3D representation which accommodate movements of part of the multifeatured object. In another embodiment, the images are generated by creating projections of the reference 3D representation(s) and their deformed variations from a range of viewpoints. In yet another embodiment, a range of images corresponding to varying lighting conditions is generated for each projection. In yet another embodiment, a range of images corresponding to varying textured color conditions of the reference 3D representation is generated for each projection. These embodiments may be variously combined.

In a second aspect, the invention comprises a system for creating a database of images of multifeatured objects of a generic type. The system comprises a generator database comprising at least one reference 3D representation of a multifeatured object of the generic type, an image generator for generating a plurality of images from the reference 3D representation(s) in the generator database, and an image database for storing the generated images. The generator database may include a representation that corresponds to at least one of the target objects. In one embodiment, the image generator generates a range of small or large deformations of the 3D representation to accommodate movements of parts of the multifeatured object. In another embodiment, the image generator generates 2D projections of the reference 3D representation(s) and their deformed variants from a range of viewpoints. In yet another embodiment, the image generator generates a range of images corresponding to varying lighting conditions for each viewpoint. In yet another embodiment, the image generator generates a range of images corresponding to varying textured color conditions for each viewpoint. These embodiments may be variously combined.

In a third aspect, the above described methods and systems are used for the case when the 3D multifeatured object is a face, and the 3D representations are "avatars," i.e., electronic 3D graphical or pictorial representations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION OF THE PREFERRED EMBODIMENT

The invention can be used for generating image databases for any multifeatured object, such as faces, animals, plants, or buildings. For ease of explanation, however, the ensuing description will focus on faces as an exemplary (and non-limiting) application.

In one embodiment of the invention, the 3D representation of the face is an avatar model. The avatar geometry may be represented by a mesh of points in 3D which are the vertices of a set of triangular polygons approximating the surface of the avatar. In one representation, each vertex is given a color value, and each triangular face may be colored according to an average of the color values assigned to its vertices. The color values are determined from a 2D texture map which may be derived from a photograph.

In general, the avatars include a full representation of a human head, including geometric detail of features such as the nose, mouth, and so on, as well as full color maps of the head. Alternatively, avatars which only have geometric and surface texture for the front of the head may be used. Avatars with generic geometries, incorporating little or no distinguishing geometric detail but possessing individual texture information may be used. Further, avatars with a combination of the above features may be used.

The avatar is associated with a coordinate system which is fixed to it, and is indexed by three angular degrees of freedom (pitch, roll, and yaw), and three translational degrees of freedom of the rigid body center in three-space. In addition, individual features of the avatar, such as the chin, teeth and eyes may have their own local coordinates (e.g., chin axis) which form part of the avatar description, facilitating the incorporation of faces with varying expressions or other internal movements. The present invention may be applied to avatars for which a different data representation is used. For example, texture values may be represented as RGB values, or using other color representations, such as HSL. The texture on the surface of the avatar may be color data which is mapped to the avatar geometry. The texture map may be a computer-based image file, such as a bitmap, or it may be a table of RGB values associated with each vertex or polygon or region of the avatar surface. The data representing the avatar vertices and the relationships among the vertices may vary. For example, the mesh points may be connected to form non-triangular polygons representing the avatar surface. The avatar(s) used herein may be generated using the method or system described in U.S. Ser. No. 10/794,353, entitled VIEWPOINT-INVARIANT IMAGE MATCHING AND GENERATION OF THREE-DIMENSIONAL MODELS FROM TWO-DIMENSIONAL IMAGERY and filed contemporaneously herewith, the entire contents of which is incorporated by reference.

The invention may include a conventional rendering engine for generating 2D imagery from a 3D avatar. The rendering engine may be implemented in OpenGL, or in any other 3D rendering system, and allows for the rapid projection of a 3D avatar into a 2D image plane representing a camera view of the 3D avatar. The rendering engine may also include lighting capability, allowing for the generation of 2D projections corresponding to varying illuminations of the avatar. As is well known in the art, lighting corresponding to a varying number of light sources of varying colors, intensities, and positions may be generated by the rendering engine.

Figure 1:
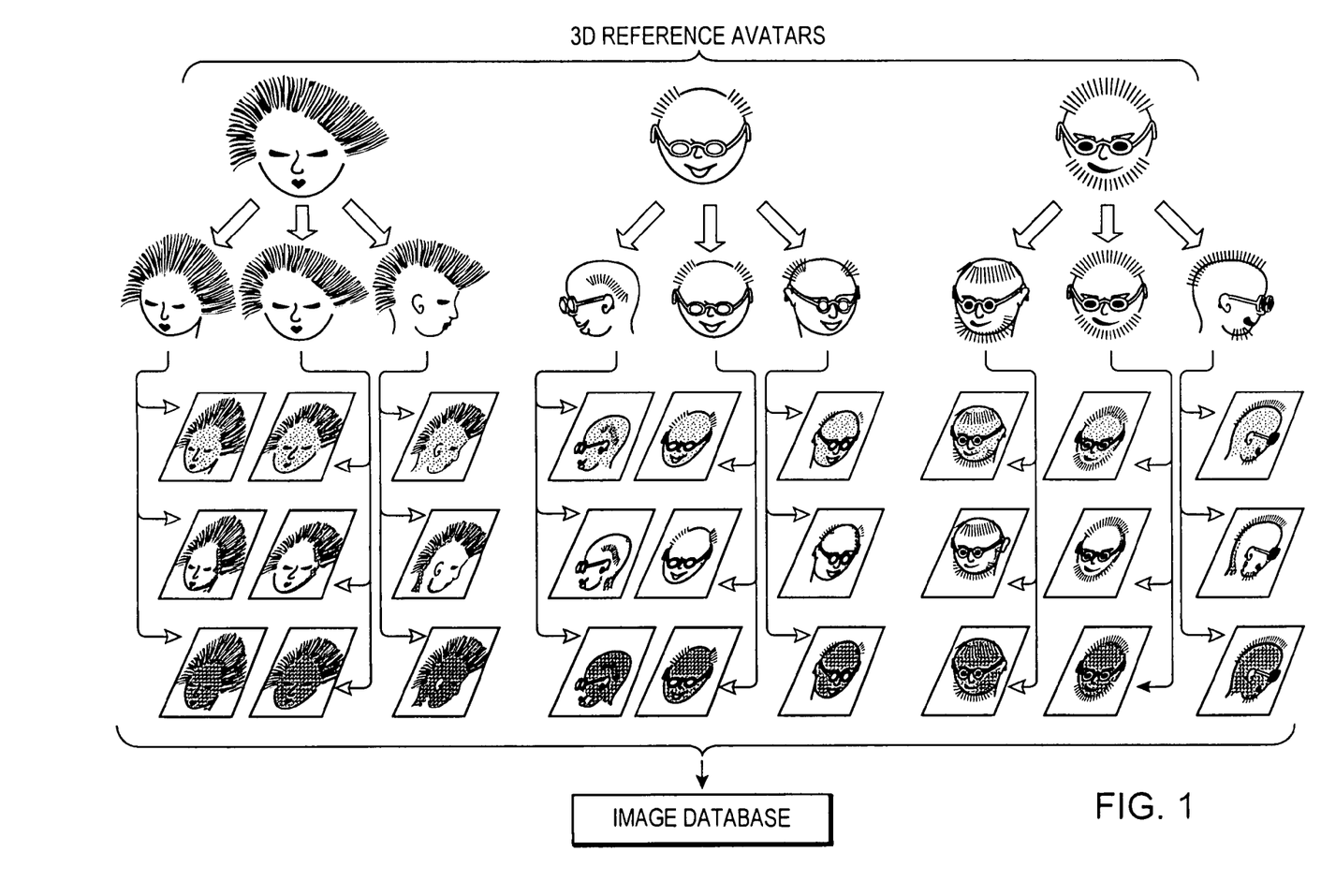
FIG. 1 schematically illustrates the various components of the invention, starting with the 3D reference objects, and yielding an image database.

FIG. 1 illustrates the basic operation of the invention in the case where the 3D multifeatured object to be identified is a face and the 3D representations are avatars. The provided reference avatars are shown at the top of the figure. As used herein, the term "pose" is taken to refer to a specific combination of viewpoint (i.e., rotation and translation) and small deformation for an avatar. Small and large deformations may correspond to chin movement, lip movement, eyebrow lifting, or other facial movement which may be associated with changes in facial expression or with talking. Each avatar is used to generate a range of images by producing projections from a range of different poses. The poses may be stepped through systematically, first proceeding incrementally through varying yaw, pitch, and roll, scale, translation, and small deformation. Next, for each pose, a range of images may be generated corresponding to variations in the lighting conditions on the avatar. These images may be used to populate a database to be used for training an identification system.

The database is preferably made rich enough so as to include a substantial fraction of the anticipated target poses and lighting. This enables creation of a system that robustly identifies the target.

The database may store the images in any of a multitude of formats, including column by column, row by row, at a number of different resolutions, and/or using a number of different color formats, including RGB. The images generated from the avatar(s) may be indexed according to pose and lighting. Each pose may be indexed by pitch, roll and yaw, scale, and translation. Alternatively, indexing over the positive sphere cross circle with translation may be used.

Detectors for an individual face are desirably built from imagery generated from a single avatar corresponding to the individual. These images may be rendered at many different scales, positions, rotations, and illuminations. To increase the efficiency of the detection process, the classification scheme is used to decompose the set of possible poses into groups ranging from coarse classifications to fine ones. The coarsest group accounts for all poses in a reference range. When a detection is performed within the coarse group, the probes within the finer range corresponding to the detection are utilized. A face is detected at a given pose if and only if every detector for a group containing the given pose gives a positive response. Such a coarse-to-fine strategy organizes the detectors generated from the avatar database so that most parts of the scene in the source image which do not include a face can be rejected using only the coarse probes, thereby employing very little computation. The more computationally intensive operations are thereby progressively concentrated in the areas where detections occur.

If it is desired to identify an individual in a particular pose, the database specificity may be increased by only generating images corresponding to the desired pose. In the case where detection of any human face rather than of a specific individual is desired, the database may aggregate all of the available reference avatars. These approaches may be used sequentially or interchangeably. For example, any human face may first be detected, then the system may be tuned to detect a specific individual, and subsequently the system may be further tuned to identify a specific individual at a particular pose.

The present invention may be especially useful in a situation where the available imagery consists mainly of front view photographs, but the only available imagery of the target (s) are side views. In this case, the image database may be weighted with images generated from the desired side pose. Systems trained on or utilizing this database will then be well tuned for side view identification.

As understood by those of ordinary skill in the art, an identification system may be trained using neural nets, Bayesian classifiers and decision trees in which hierarchical detection probes are built from the generated image database. The probes consist of arrays of edge values oriented vertically, horizontally, and diagonally, with a value of 0 or 1. A value of 1 in the probe mask corresponds to the occurrence of a consistent discontinuity with a value above a fixed threshold that is seen in a majority of the input training images; a value of 0 corresponds to the absence of such a discontinuity. A probe at a particular scale and orientation outputs a positive detection if the input image has a set of discontinuities greater than the threshold at a sufficient (generally large) fraction of the locations covered by the probe. The fraction may be computed via an inner product, logical comparison, or other known method for determining agreement between the input image and the probe detector mask.

Figure 2:
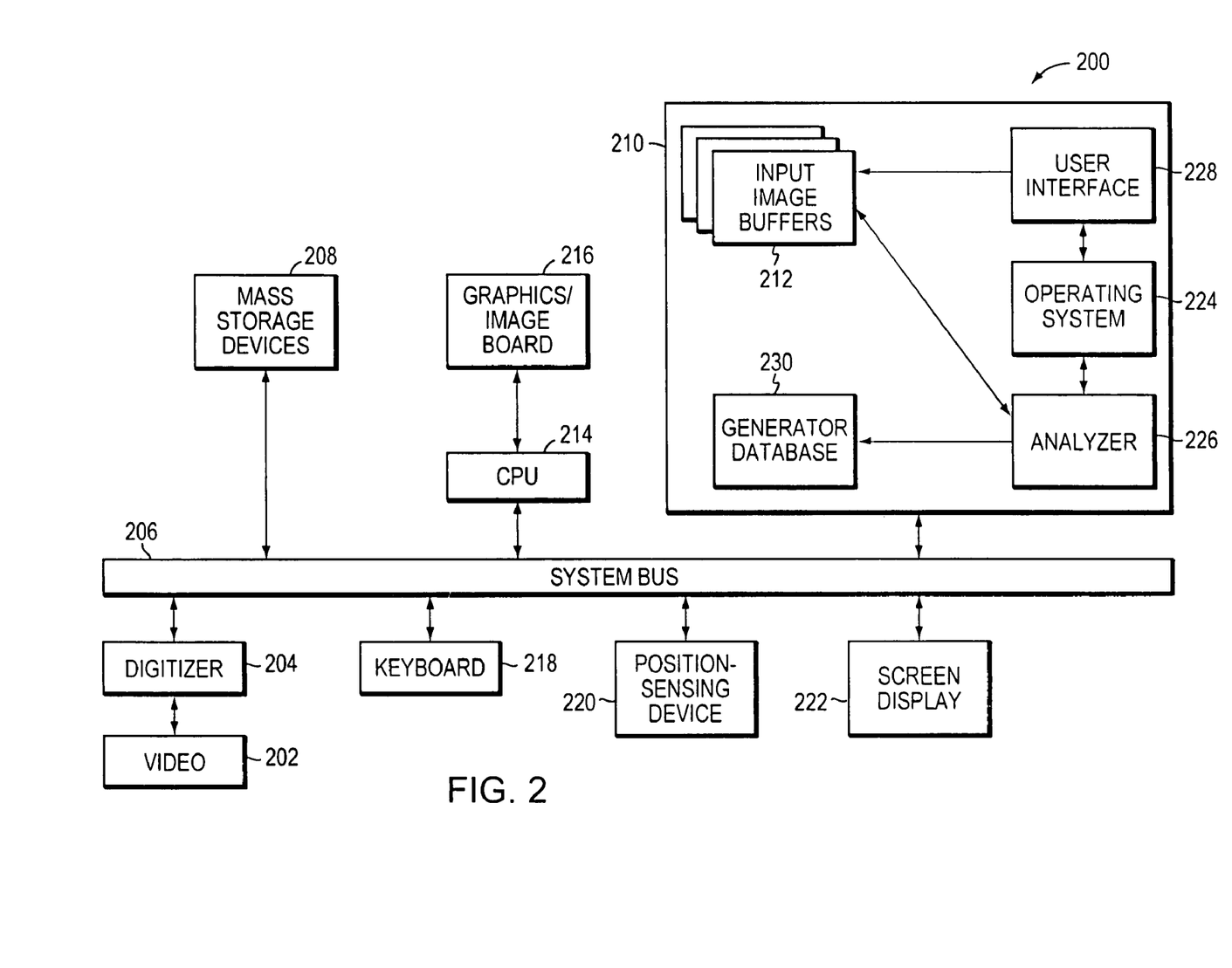
FIG. 2 is a block diagram showing a representative hardware environment for the present invention.

Refer now to FIG. 2, which illustrates a hardware system 200 incorporating the invention. As indicated therein, the system includes a video source 202 (e.g., a video camera or a scanning device) which supplies a still input image to be analyzed. The input image may be an image of a target face to be identified by means of a system trained with or directly using the image database generated by the present invention. The output of the video source 202 is digitized as a frame into an array of pixels by a digitizer 204. The digitized images are transmitted along the system bus 206 over which all system components communicate, and may be stored in a mass storage device (such as a hard disc or optical storage unit) 208 as well as in main system memory 210 (specifically, within a partition defining a series of identically sized input image buffers) 212.

The operation of the illustrated system is directed by a central-processing unit ("CPU") 214. To facilitate rapid execution of the image-processing operations hereinafter described, the system preferably contains a graphics or image-processing board 216; this is a standard component well-known to those skilled in the art.

The user interacts with the system using a keyboard 218 and a position-sensing device (e.g., a mouse) 220. The output of either device can be used to designate information or select particular points or areas of a screen display 220 to direct functions performed by the system.

The main memory 210 contains a group of modules that control the operation of the CPU 212 and its interaction with the other hardware components. An operating system 222 directs the execution of low-level, basic system functions such as memory allocation, file management and operation of mass storage devices 208. At a higher level, the analyzer 226, implemented as a series of stored instructions, directs execution of the primary functions performed by the invention, as discussed below; and instructions defining a user interface 228 allow straightforward interaction over screen display 222. The user interface 228 generates words or graphical images on the display 222 to prompt action by the user, and accepts commands from the keyboard 218 and/or position-sensing device 220. Finally, the memory 210 includes a partition 230 for storing a generator database of 3D avatars, as described above.

The contents of each image buffer 212 define a "raster," i.e., a regular 2D pattern of discrete pixel positions that collectively represent an image and may be used to drive (e.g., by means of image-processing board 216 or an image server) screen display 222 to display that image. The content of each memory location in a frame buffer directly governs the appearance of a corresponding pixel on the display 222.

It must be understood that although the modules of main memory 210 have been described separately, this is for clarity of presentation only; so long as the system performs all the necessary functions, it is immaterial how they are distributed within the system and the programming architecture thereof. Likewise, though conceptually organized as grids, pixelmaps need not actually be stored digitally in this fashion. Rather, for convenience of memory utilization and transmission, the raster pattern is usually encoded as an ordered array of pixels.

Figure 3:
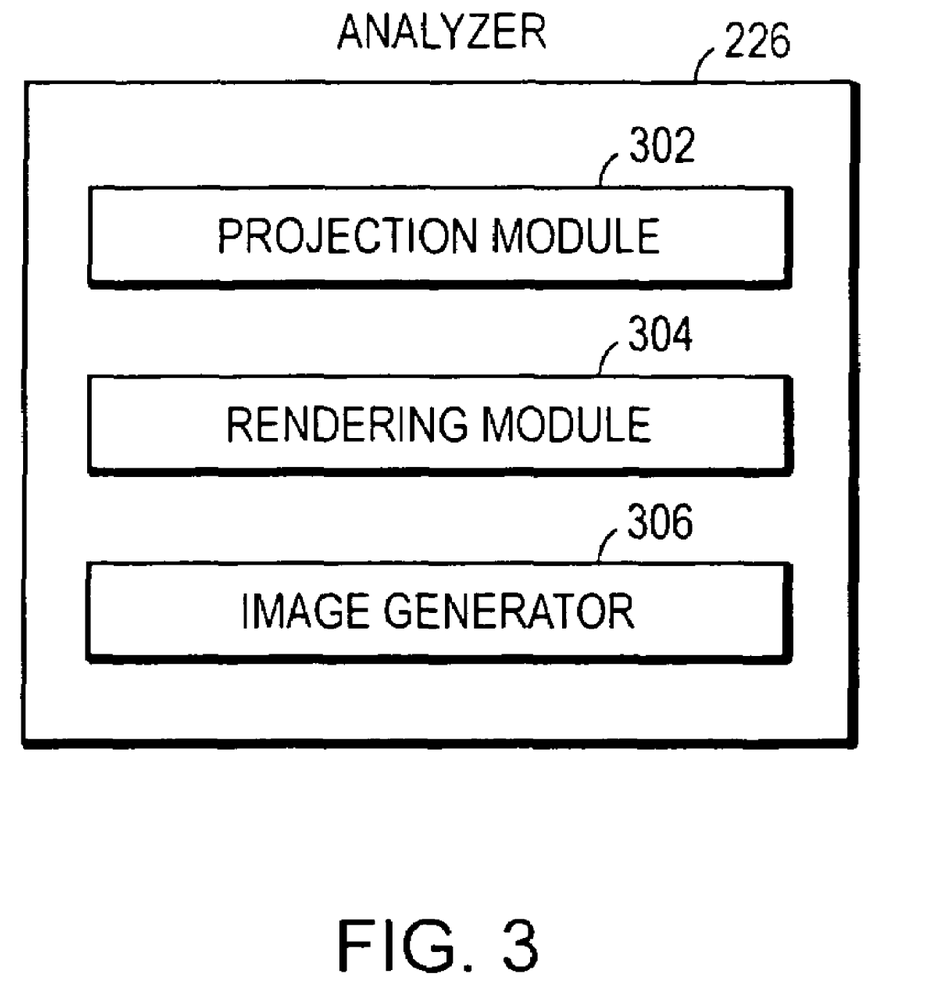
FIG. 3 is a block diagram showing the key components of the analyzer illustrated in FIG. 2.

As noted above, execution of the key tasks associated with the present invention is directed by the analyzer 226, which governs the operation of the CPU 212 and controls its interaction with main memory 210 in performing the steps necessary to generate and populate an image database for training an identification system. FIG. 3 illustrates the components of a preferred implementation of the analyzer 226. The projection module 302 takes a 3D model and makes a 2D projection of it onto any chosen plane. In general, an efficient projection module 302 is highly desirable in order to create, in a realistic time frame, numerous projections over the space of poses for each of the generating avatars. The rendering module 304 allows for the rapid projection of a 3D avatar into 2D with the option of including the specification of the avatar lighting. The image generator 306 selects a pose and lighting and uses the projection module and rendering module to generate an image for the image database.

Figure 4:
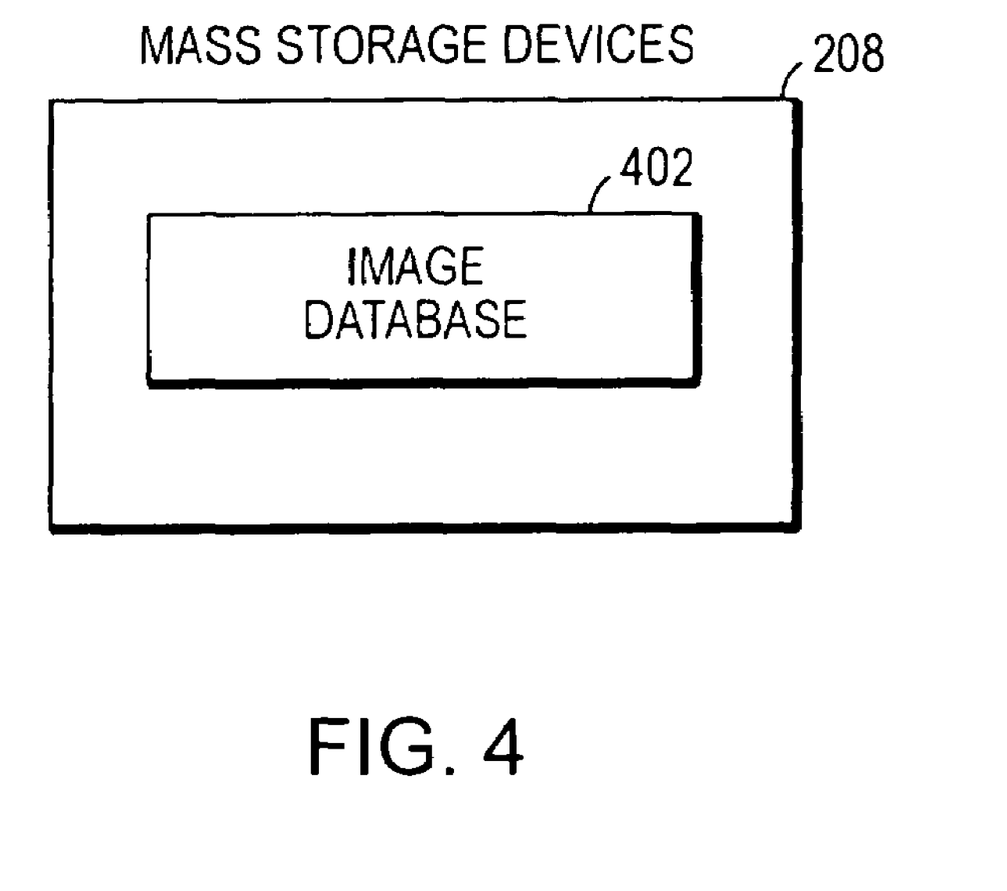
FIG. 4 is a block diagram showing the key component of the mass storage devices shown in FIG. 2.
Figure 5:
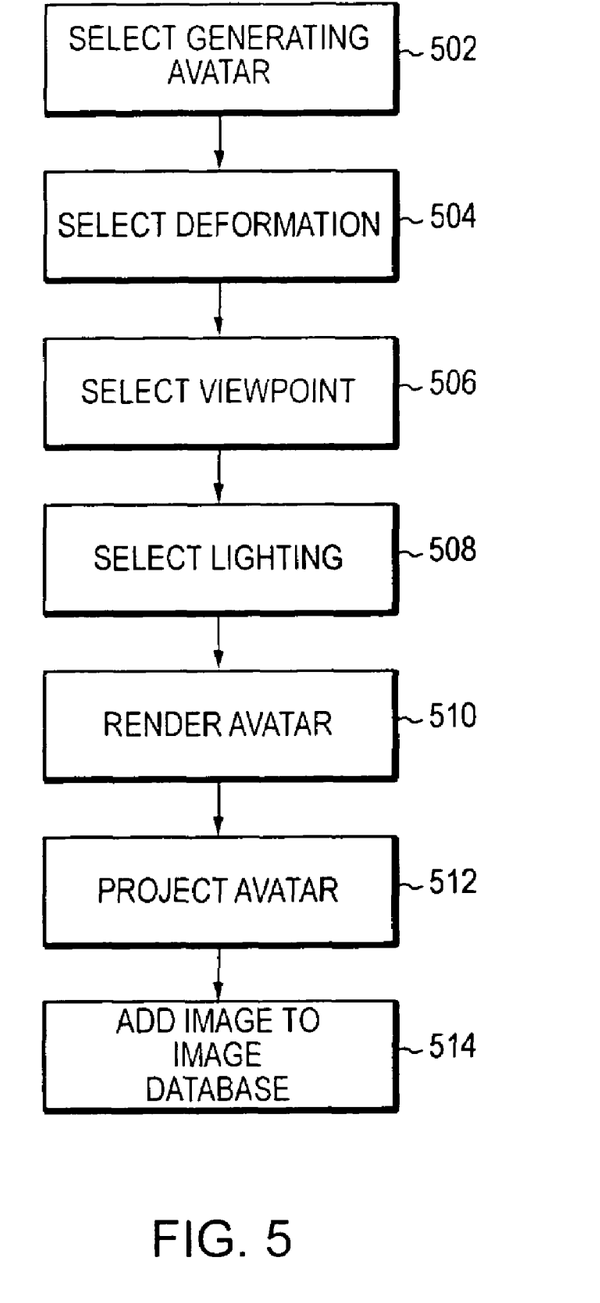
FIG. 5 is a block diagram showing the key functions of the analyzer.

FIG. 4 illustrates an embodiment of the invention in which the image database 402 is stored within the mass storage devices 208. In other embodiments, the image database (or a working portion thereof) may be stored in main memory 210, or in offline storage systems. FIG. 5 illustrates the main functions of the invention performed in main memory. In step 502, a generating avatar is selected. Next, in step 504, a particular small deformation of the avatar selected in step 502 is chosen. In step 506, a viewpoint is selected from which to project the avatar with the geometry corresponding to the selections in steps 502 and 504. A particular lighting for the pose resulting from steps 502, 504, and 506 is then selected in step 508. In step 510 the selected combination of avatar, pose, and lighting is rendered using rendering module, and, in step 512, projected to generate an image. The resulting image is added to the image database in step 514. Steps 502-514 are then repeated for each desired lighting corresponding to each desired pose corresponding to each desired generating avatar.

The sequence of steps of FIG. 5 is intended to be illustrative and non-limiting; the present invention may proceed via any of the possible sequences of steps to generate the images. For example, the images may be generated by first selecting the generating avatar (step 502), the viewpoint (step 506), and the lighting (step 508), and then iterating over the possible small deformations (step 504) before rendering (step 510) and projecting (step 512) the model to generate the image.

As noted previously, while certain aspects of the hardware implementation have been described for the case where the target object is a face and the reference object is an avatar, the invention is not limited to the generation of training databases for facial identification systems, but may be used to generate training database for the identification of any multifeatured object.

It will therefore be seen that the foregoing represents a highly extensible and advantageous approach to the generation of 3D models of a target multifeatured object when only partial information describing the object is available. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits, or as mixed hardware-software combinations (wherein, for example, pixel manipulation and rendering is performed by dedicated hardware components).

What is claimed is:

1. A processor-implemented method for using a library of candidate 3D representations to create a database of fin ages, the method comprising:
   generating a plurality of reference 3D representations, each corresponding to a different one of a plurality of multifeatured objects, said generating comprising:
   providing one or more source 2D images for each of the multifeatured objects of the plurality of multifeatured objects;
   for each multifeatured object of the plurality of multifeatured objects,
   (1) searching within the library of candidate 3D representations to locate a best-fit 3D representation for the one or more source 2D images for that multifeatured object; and
   (2) from the best-fit 3D representation, generating one of the reference 3D representations within the plurality of reference 3D representations,
   wherein said searching involves selecting each candidate 3D representation in the library of candidate 3D representations and for each selected candidate 3D representation applying one or more operators to that selected 3D representation to generate multiple versions of that selected 3D representation, and for each version of that selected 3D representation, computing a measure of fit between a 2D projection of that version of that selected 3D representation and the one or more source 2D images for that multifeatured object,
   wherein the best-fit 3D representation is the version of the candidate 3D representation from the library that yields a best measure of fit, and
   wherein the one or more operators are selected from the group consisting of rigid motion operators and deformation operators;
   for each reference 3D representation of the plurality of reference 3D representations, generating a plurality of deformed versions of that reference 3D representation and for each of a plurality of different viewpoints, generating a plurality of 2D projections for each of the plurality of deformed versions of the reference 3D representation; and
   populating the database with the generated 2D projections, wherein the steps of generating, searching, computing a measure of fit, and populating are performed by the processor.

2. The method of claim 1, further comprising generating a range of images corresponding to varying lighting conditions for each of the plurality of different viewpoints.

3. The method of claim 1, further comprising, for each reference 3D representation of the plurality of reference 3D representations, generating a range of images corresponding to varying textured color conditions for that reference 3D representation.

4. The method of claim 1, wherein at least one of the plurality of reference 3D representations corresponds to at least one object which is to be identified.

5. The method of claim 1, wherein generating the plurality of deformed versions for each reference 3D representation of the plurality of reference 3D representations involves applying at least one of (i) a range of small deformations and (ii) a range of large deformations.

6. A processor-implemented method for using a library of candidate 3D avatars to create a database of facial images, the method comprising:
   generating a plurality of reference 3D avatars, each corresponding to a different source 3D object among a plurality of source 3D objects, said generating comprising:
   providing one or more source 2D images for each of the source 3D objects of the plurality of source 3D objects;
   for each source 3D object of the plurality of source 3D objects,
   (1) searching within the library of candidate 3D avatars to locate a best-fit 3D avatar for the one or more source 2D images for that source 3D object; and
   (2) from the best-fit 3D avatar, generating one of the reference 3D avatars within the plurality of reference 3D avatars,
   wherein said searching involves selecting each candidate 3D avatar in the library of candidate 3D avatars and for each selected 3D avatar applying one or more operators to that selected 3D avatar to generate multiple versions of that selected 3D avatar, and for each version of that selected 3D avatar, computing a measure of fit between a 2D projection of that version of that selected 3D avatar and the one or more source 2D images for that source 3D object,
   wherein the best-fit 3D avatar is the version of the candidate 3D avatar from the library that yields a best measure of fit, and
   wherein the one or more operators are selected from the group consisting of rigid motion operators and deformation operators;
   for each reference 3D avatar of the plurality of reference 3D avatars, generating a plurality of deformed versions of that reference 3D avatar arid for each of a plurality of different viewpoints, generating a plurality of 2D projections for each of the plurality of deformed versions of the reference 3D avatar; and
   populating the database with the generated 2D projections, wherein the steps of generating, searching, computing a measure of fit, and populating are performed by the processor.

7. The method of claim 6, further comprising generating a range of images corresponding to varying lighting conditions for each of the plurality of different viewpoints.

8. The method of claim 6, further comprising, for each reference 3D avatar of the plurality of reference 3D avatars, generating a range of images corresponding to varying textured color conditions for that reference 3D avatar.

9. The method of claim 6, wherein at least one of the plurality of reference 3D avatars corresponds to at least one face which is to be identified.

10. The method of claim 6, wherein generating the plurality of deformed versions for each reference 3D avatar of the plurality of reference 3D avatars involves applying at least one of (i) a range of small deformations and (ii) a range of large deformations.

11. A system comprising a processor and storage media storing code which when executed on the processor implements:
- a 3D representation generator for generating a database of a plurality of reference 3D representations, each corresponding to a different one of a plurality of multifeatured objects, said 3D representation generator configured to obtain one or more source 2D images for each of the multifeatured objects of a plurality of multifeatured objects and for each multifeatured object of the plurality of multi featured objects,
  (1) search within a library of candidate 3D representations to locate a best-fit 3D representation for the one or more source 2D images for that multifeatured object; and
  (2) from the best-fit 3D representation, generate one of the reference 3D representations within the plurality of reference 3D representations,
- wherein said searching involves selecting each candidate 3D representation in the library of candidate 3D representations and for each selected candidate 3D representation applying one or more operators to that selected 3D representation to generate multiple versions of that selected 3D representation, and for each version of that selected 3D representation, computing a measure of fit between a 2D projection of that version of that selected 3D representation and the one or more source 2D images for that multifeatured object,
- wherein the best-fit 3D representation is the version of the candidate 3D representation from the library that yields a best measure of fit, and
- wherein the one or more operators are selected from the group consisting of rigid motion operators and deformation operators; and
- an image generator for generating for each reference 3D representation of the plurality of reference 3D representations, a plurality of deformed versions of that reference 3D representation and for generating for each of a plurality of different viewpoints, a plurality of 2D projections for each of the plurality of deformed versions of the reference 3D representation,
- wherein said system further comprises an image database for storing the generated 2D projections.

12. The system of claim 11, wherein, for each viewpoint of the plurality of different viewpoints, the image generator generates a range of images corresponding to varying lighting conditions.

13. The system of claim 11, wherein, for each viewpoint of the plurality of different viewpoints, the image generator generates a range of images corresponding to varying textured color conditions of the reference 3D representation.

14. The system of claim 11, wherein the database of a plurality of reference 3D representations includes among the plurality of reference 3D representations at least one 3D representation of at least one object which is to be identified.

15. The system of claim 11, wherein the image generator generates the plurality of deformed versions for each reference 3D representation of the plurality of reference 3D representations by applying at least one of (i) a range of small deformations and (ii) a range of large deformations.

16. A system comprising a processor and storage media storing code which when executed on the processor implements:
- a 3D avatar generator for generating a database of a plurality of reference 3D avatars, each corresponding to a different one of a plurality of source 3D objects, said 3D avatar generator configured to obtain one or more source 2D images for each of the source 3D objects of a plurality of source 3D objects and for each source 3D avatar of the plurality of source 3D objects,
  (1) search within a library of candidate 3D avatars to locate a best-fit 3D avatar for the one or more source 2D images for that source 3D object; and
  (2) from the best-fit 3D avatar, generate one of the reference 3D avatars within the plurality of reference 3D avatars,
- wherein said searching involves selecting each candidate 3D avatar in the library of candidate 3D avatars and for each selected 3D avatar applying one or more operators to that selected 3D avatar to generate multiple versions of that selected 3D avatar, and for each version of that selected 3D avatar, computing a measure of fit between a 2D projection of that version of that selected 3D avatar and the one or more source 2D images for that source 3D object,
- wherein the best-fit 3D avatar is the version of the candidate 3D avatar from the library that yields a best measure of fit, arid
- wherein the one or more operators are selected from the group consisting of rigid motion operators and deformation operators; and
- an image generator for generating for each reference 3D avatar of the plurality of reference 3D avatars, a plurality of deformed versions of that reference 3D avatar and for generating for each of a plurality of different viewpoints, a plurality of 2D projections for each of the plurality of deformed versions of the reference 3D avatar,
- wherein said system further comprises an image database for storing the generated 2D projections.

17. The system of claim 16, wherein, for each different viewpoint of the plurality of different viewpoints, the image generator generates a range of images corresponding to varying lighting conditions.

18. The system of claim 16, wherein, for each different viewpoint of the plurality of different viewpoints, the image generator generates a range of images corresponding to varying textured color conditions for that reference 3D avatar.

19. The system of claim 16, wherein the generator database includes among the plurality of reference 3D avatars at least one 3D avatar of at least one face which is to be identified.

20. The system of claim 16, wherein the image generator generates the plurality of deformed versions for each reference 3D avatar of the plurality of reference 3D avatars by applying at least one of (i) a range of small deformations and (ii) a range of large deformations.

* * * * *

UNITED STATES PATENT AND TRADEMARK OFFICE
CERTIFICATE OF CORRECTION

PATENT NO. : 7,643,683 B2  Page 1 of 1
APPLICATION NO. : 10/794352
DATED : January 5, 2010
INVENTOR(S) : Michael Miller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Twenty-first Day of December, 2010

David J. Kappos
*Director of the United States Patent and Trademark Office*